UNITED STATES PATENT OFFICE.

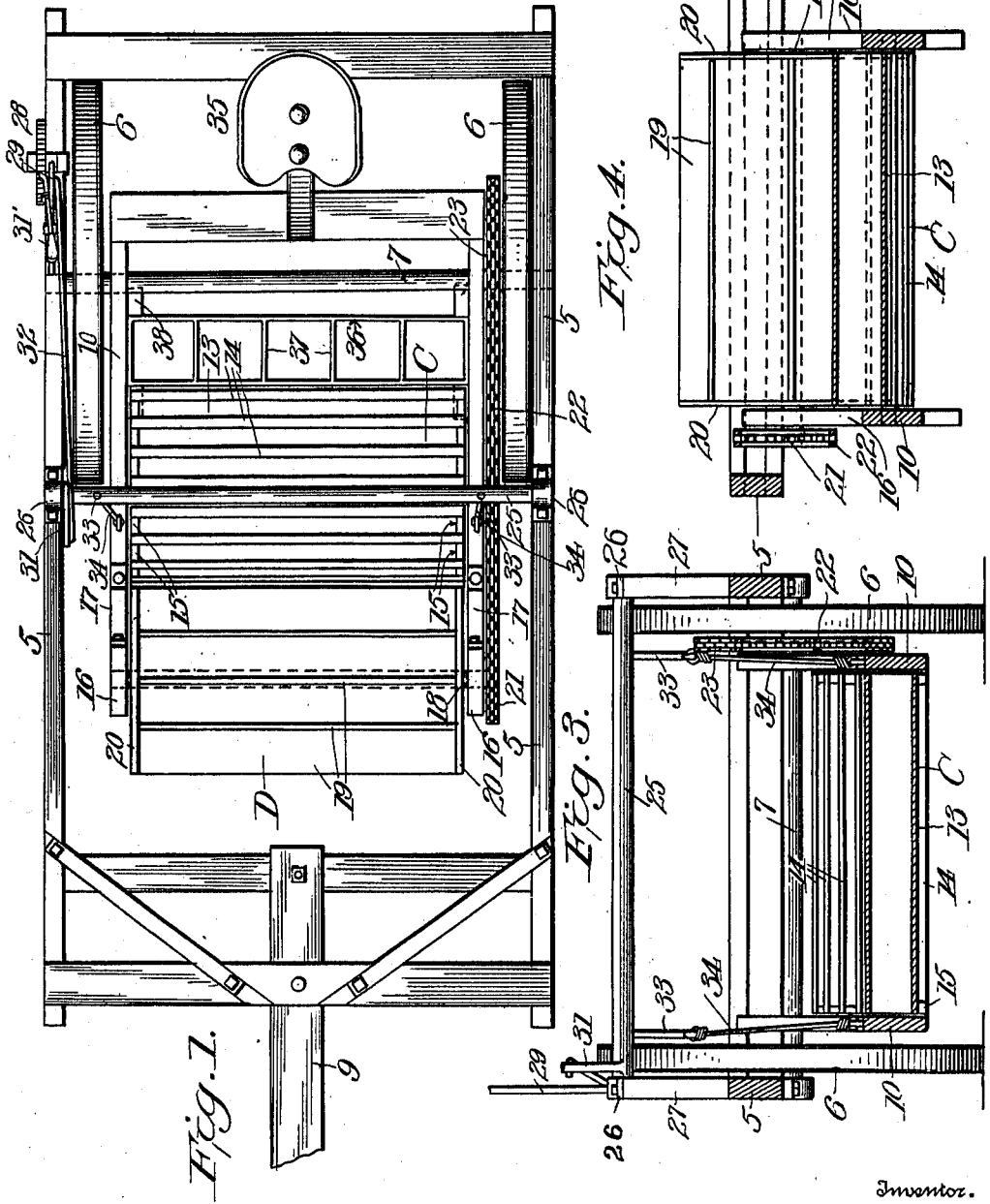

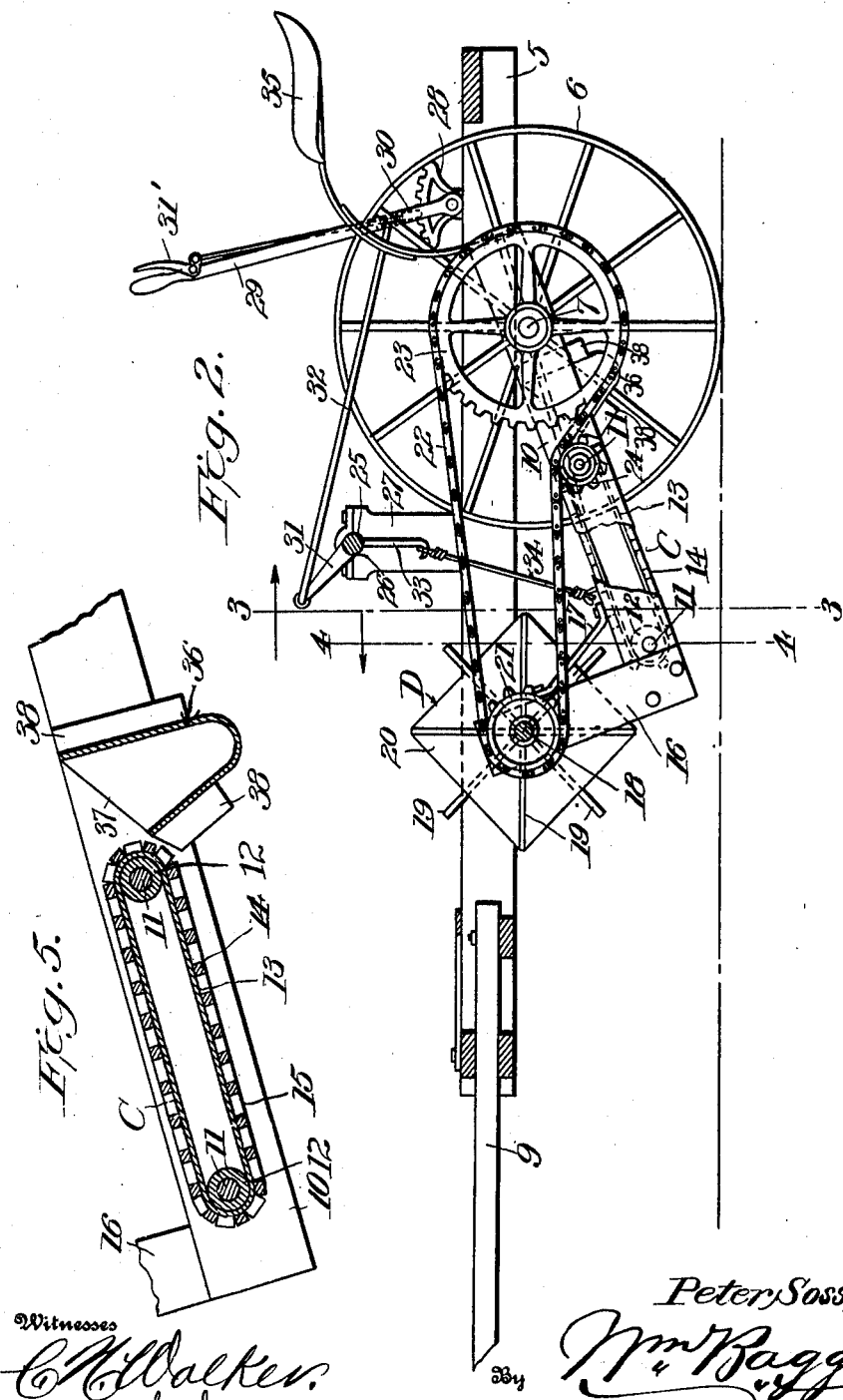

PETER SOSS, JR., OF BLOOMINGTON, ILLINOIS, ASSIGNOR OF ONE-HALF TO PETER SOSS, SR., OF BLOOMINGTON, ILLINOIS.

INSECT-EXTERMINATOR.

988,517.

Specification of Letters Patent. Patented Apr. 4, 1911.

Application filed May 24, 1909. Serial No. 497,988.

*To all whom it may concern:*

Be it known that I, PETER Soss, Jr., a citizen of the United States, residing at Bloomington, in the county of McLean and State of Illinois, have invented certain new and useful Improvements in Insect-Exterminators, of which the following is a specification.

This invention relates to machines for exterminating potato bugs and other obnoxious insects and vermin infesting potato plants and other similar plants and vines, and it has for its objects to provide a machine of this class which shall be simple in construction, inexpensive, easily operated and thoroughly efficient in operation.

A further object of the invention is to provide a machine of the character described which shall be mounted upon wheels adapted to straddle one or more rows of plants, said machine embodying in its structure a main frame and an auxiliary frame, the latter being pivotally supported upon the axle of the machine and adapted for adjustment, said auxiliary frame carrying a reel to brush the insects off the plants, a conveyer to receive the insects and to carry them in an upward and rearward direction, and a trough or tank containing a liquid insecticide such as crude oil, into which the insects will be dropped and thus destroyed.

Further objects of the invention are to simplify and improve the general construction of the machine outlined above.

With these and other ends in view which will readily appear as the nature of the invention is better understood, the same consists in the improved construction, arrangement and combination of parts which will be hereinafter fully described and particularly pointed out in the claims.

In the accompanying drawings has been shown a simple and preferred form of the invention, it being, however, understood that no limitation is necessarily made to the precise structural details therein exhibited, but that changes, alterations and modifications within the scope of the invention may be resorted to when desired.

In the drawings—Figure 1 is a top plan view of a machine constructed in accordance with the invention. Fig. 2 is a side elevation of said machine, partly in section. Fig. 3 is a transverse sectional view taken on the plane indicated by the line 3—3 in Fig. 2. Fig. 4 is a transverse sectional view taken on the plane indicated by the line 4—4 in Fig. 2. Fig. 5 is a longitudinal sectional detail view showing a portion of the auxiliary frame together with the conveyer and the receiving tank.

Corresponding parts of the several figures are denoted by like characters of reference.

The main frame 5 of the improved machine is preferably of rectangular shape, said frame being supported by the wheels 6 which are mounted upon the axle 7, which is supported for rotation in suitable boxes or bearings upon the under side of the frame. The wheels 6 are preferably disposed adjacent to the inner sides of the side members of the frame 5 as will clearly appear by reference to Fig. 1 of the drawings, and the side members of the frame will thus in a measure constitute guards to prevent the wheels from injuring adjacent rows of plants when the machine is in operation. The forward end of the frame is provided with means for attaching the draft, including a tongue 9.

An auxiliary frame 10 which is mainly of rectangular shape, is mounted pivotally upon the axle 7, between the transporting wheels, said frame being provided with bearings for a pair of shafts 11 carrying rollers 12 upon which an endless conveyer C is supported for operation, said conveyer being composed essentially of an apron 13 equipped with suitably spaced transverse slats 14 and preferably provided with blocks or guard members 15 arranged adjacent to the ends of the slats for a purpose which will be presently set forth. The frame 10 is provided adjacent to its forward end with brackets 16 reinforced by braces 17, said brackets being provided at their upper ends with boxes or bearings whereby a shaft 18 is supported for rotation, said shaft carrying a reel D composed of a plurality of radiating blades 19 and provided at its ends with closures 20 which have been shown as being substantially square so that some of the blades, of which there are eight, will project beyond the side edges of said closures as clearly shown in Fig. 2. The shaft 18 carries at one end a pinion 21 which is disposed adjacent to the outer surface of one of the side members of the frame 10, said pinion being connected by a chain 22 with a spur wheel 23 which is suitably mounted upon or connected with one of the transporting wheels 6. One of the shafts 11 is likewise equipped with a pinion 24 which is engaged by the lower lead of the chain 22, the latter thus serving to transmit motion from the transporting wheels 6 to the endless conveyer C as well as to the reel-carrying shaft 18.

To provide for the vertical adjustment of the lower or forward extremity of the pivotally supported auxiliary frame 10, a rockshaft 25 is provided, said shaft being supported for oscillation in boxes or bearings 26 at the upper ends of brackets or uprights 27 rising from the side members of the main frame 5. The latter frame also carries a rack segment 28 upon which a hand lever 29 is fulcrumed, said hand lever being equipped with a spring-actuated stop member 30 engaging the rack and with a handle 31' for manipulating said stop member all of these parts being of ordinary well known construction. The rock-shaft 25 has a radially extending arm 31 which is connected by a link 32 with the hand lever 29 which latter may thus be utilized for oscillating the rock-shaft in its bearings and for securing it at various adjustments. The rock-shaft is also provided with depending hooks 33 connected by rods, links or equivalent connecting means 34 with the side members of the auxiliary frame which latter, it will thus be seen, may be adjusted by oscillating the rock-shaft through the medium of the hand lever so as to enable the reel carried by the lower end of said auxiliary frame to engage plants of various dimensions, and likewise enabling the lower end of the frame to be lifted to a point where it will clear the plants altogether, when desired.

Suitably mounted upon the rear end of the auxiliary frame in rear of the axle 7 upon which said frame is mounted, is a seat 35 for the driver whose weight will thus be utilized to counterbalance that of the reel and the lower part of the auxiliary frame, readily facilitating any desired adjustment of the latter. The driver's seat 35 is also conveniently located with relation to the hand lever 29.

Suitably supported by the auxiliary frame 10, in rear of the endless conveyer and in front of the axle 7 is a tank 36 adapted to contain a liquid insecticide such as crude oil and provided with a plurality of transverse partitions 37 whereby the liquid will be confined and prevented from spilling over the edges of the tank. Cleats 38 upon the inner sides of the side members of the auxiliary frame, serve to support the tank 36 in position for operation with its forward edge closely adjacent to the endless conveyer so that insects carried by the latter will surely be discharged into said tank. The tank 36 is preferably made tapering toward its lower end, so that it may be conveniently supported at each end upon two downwardly converging cleats secured upon the inner faces of the side members of the auxiliary frame; it will also be noticed that the rear wall of the tank projects a considerable distance above the front wall, the side members of the tank being correspondingly inclined at their upper edges; the rear wall of the tank will thus constitute a shield to intercept bugs and vermin that might otherwise be discharged over the rear edge of the tank when the machine is in rapid operation.

From the foregoing description taken in connection with the drawings thereto annexed, the operation and advantages of this invention will be readily understood by those skilled in the art to which it appertains. The wheels of the machine may be made to straddle one or more rows of plants according to the dimensions of the machine although it will usually be found preferable to operate upon a single row. The auxiliary frame 10 having been adjusted to the height of the plants, the machine is propelled in a forward direction, thus causing the blades of the reel to beat and sweep the insects off the plants or vines in the direction of the endless conveyer upon which they will be lodged between the slats 14. The guard blocks 15 placed intermediate the ends of the slats will prevent the insects from escaping between the side edges of the apron and the inner sides of the side members of the frame, and the insects will thus be surely discharged into the tank 36 where they are destroyed as previously stated.

The general construction of this machine is extremely simple and inexpensive. It may be operated with great ease and convenience, and it is found in practice to be thoroughly efficient for the purposes for which it is provided.

Having thus described the invention, what is claimed is:

1. In a machine of the character described, the combination of a main frame, an axle carried thereby, supporting wheels carried by the axle, an auxiliary frame pivotally mounted upon and extending in front and rear of the axle, a driver's seat upon the rear end of said auxiliary frame, a gathering device upon the forward end of said auxiliary frame, a tank upon the auxiliary frame in rear of the gathering device, a conveyer on the auxiliary frame between the gathering device and tank, gearing for driving the gathering device and conveyer, and means for adjusting the auxiliary frame.

2. In a machine of the character described, the combination of a main frame, an axle carried thereby, supporting wheels carried by the axle, an auxiliary frame pivotally mounted upon and extending in front of and rear of the axle, said auxiliary frame being normally inclined downward and forward, brackets projecting upward from the forward end of the auxiliary frame, a horizontal shaft journaled in said brackets, a rotary gatherer mounted on said shaft, said gatherer being arranged to rotate in a vertical plane and provided with gatherer blades, a driver's seat upon the rear end of the auxiliary frame, a tank upon the auxiliary frame in rear of the gathering device, a conveyer on the auxiliary frame between the gathering device and tank, gearing for driving the gathering device and conveyer, and means for adjusting the auxiliary frame.

3. In a machine of the character described, the combination of a main frame, an axle carried thereby, supporting wheels carried by the axle, an auxiliary frame pivotally mounted upon and extending in front and rear of the axle, a driver's seat upon the rear end of the auxiliary frame, a rotary gathering device upon the forward end of the auxiliary frame, a tank upon the auxiliary frame in rear of the gathering device, a conveyer on the auxiliary frame between the gathering device and tank, gearing for driving the gathering device and conveyer, a rock shaft on the main frame, means for actuating said shaft, a connection between the shaft and auxiliary frame for raising and lowering the latter, and means for locking the parts in adjusted position.

4. In a machine of the character described, the combination with gathering and conveying means, and a frame supporting said means, of converging cleats secured upon the inner sides of the side members of said frame, and a receiving tank supported detachably upon said cleats with its forward edge adjacent to the discharge end of the conveying means, said tank being provided with a plurality of compartments and with a rear wall extending considerably above the upper edge of the front wall which is disposed adjacent to the discharge end of the conveying means.

In testimony whereof I affix my signature in presence of two witnesses.

PETER SOSS, Jr.

Witnesses:
R. M. MILLER,
J. E. MORRISON.

---

Copies of this patent may be obtained for five cents each, by addressing the "Commissioner of Patents, Washington, D. C."